United States Patent [19]
Chen et al.

[11] Patent Number: 6,008,623
[45] Date of Patent: Dec. 28, 1999

[54] CHARGE EQUALIZER OR SERIES OF CONNECTED BATTERY STRINGS

[75] Inventors: Tshaw-Chuang Chen; Zen-Jey Guey, both of Hsin-Chu, Taiwan

[73] Assignee: Industrial Technology Research Institute, Hsinchu Hsien, Taiwan

[21] Appl. No.: 09/270,651

[22] Filed: Mar. 16, 1999

[30] Foreign Application Priority Data

Nov. 30, 1998 [TW]  Taiwan ................................ 87219855

[51] Int. Cl.$^6$ ................................................. H01M 10/46
[52] U.S. Cl. ........................................... 320/118; 320/119
[58] Field of Search .................................... 320/116, 118, 320/119, 121, 127, 128, 139, 140, 141

[56] References Cited

U.S. PATENT DOCUMENTS 5,659,237  8/1997  Divan et al. ............................ 320/119

*Primary Examiner*—Edward H. Tso
*Attorney, Agent, or Firm*—Smith, Gambrell & Russell, LLP

[57] ABSTRACT

A charge equalizer adapted a battery charger to equally charge series of connected battery strings, comprising battery voltage sensing circuits, a microcontroller, logic and driving circuits, and flyback converters, operates to prevent the batteries of the series of connected battery strings from overcharging by activating the flyback converters to draw out the overcharging currents of the batteries in the series of connected battery strings and charging the whole battery strings by recharging currents which proportion to said drawn out currents as detecting each of the battery voltages in the battery strings being higher than a pre-determined voltage value during charging and digitizing the detected battery voltage signals; so as to achieve the purposes of equal charge in each battery and hence to improve the life of the battery strings as a whole.

6 Claims, 10 Drawing Sheets

CHARGE EQUALIZER OR SERIES OF CONNECTED BATTERY STRINGS

BACKGROUND OF THE INVENTION

1. Field of the Invention

The present invention relates to a battery charger. More particularly, it relates to a battery charge equalizer for a series of connected battery strings to be equally charged.

2. Description of the Prior Art

Charge equalization enhances the uniformity of the battery. Difference in battery chemistry during repeated cycles of battery charge and discharge, lead to large nonuniformities in battery charge levels and corresponding differences in battery terminal voltages. During charging of a battery composed of a series of batteries, some batteries will consequently reach full charge before others and before the overall battery terminal voltage reaches its nominal value. Such a process leads to overcharging of a subset of batteries. If these batteries are charged into the gassing phase, there can be significant degradation of the battery life. If battery strings monitoring and recharging is done on a single-battery basis, it is possible to maintain each battery at its optimal operating point, and to maximize battery life. Hence, it is usual to use a power converter to provide charge equalization for all the batteries in a series string.

Referring to FIG. 1, there is a conventional battery charge equalizer constituted with shunt resistors, wherein B1, B2, B3 and B4 represent a series of connected battery strings; R1, R2, R3 and R4 represent resistors; SW1, SW2, SW3 and SW4 represent switches; and 1 represents a battery voltage sensing and controlling circuits. The battery voltage sensing and controlling circuits 1 detects the charging condition of each battery of the series of connected battery strings. As any one of the batteries, such as battery B1 has reached its pre-determined voltage value earlier than others and is detected by the battery voltage sensing and controlling circuits 1, the battery voltage sensing and controlling circuits 1 outputs an OP1 signal to turn on the switch SW1 letting a part of current which originally charges into battery B1 pass through the resistor R1 to maintain the battery B1 voltage without overcharging it, so as to avoid damaging the battery itself Hence the series of connected battery strings B1, B2, B3 and B4 can be charged to a proper voltage level without overcharging. But this type of battery charge equalizer with shunt resistors will waste energy and is inefficient.

There is another type of conventional battery charge equalizer, which is constructed with a flyback converter with a transformer consisting of one primary coil and a number of identical secondary coils equal to the number of batteries, which draws out current from the whole battery system and directs the output energy to the batteries with the lowest voltage. An example of battery charge equalizer with a flyback converter consisting of three series of connected batteries B1, B2, B3 is shown in FIG. 2. Under ideal conditions, this system is in the standby mode. A simple comparative circuit (not shown in FIG. 2) monitors the battery voltages. The flyback converter is activated as soon as one of the voltages deviates by more than a pre-determined tolerance value. A switch SW5 will be switched on, and off with high frequency and energy will be transferred from the whole battery via the transformer and the rectifying diodes D11, D12, D13 on the battery B1, B2, B3 respectively to the individual battery again. During this process, the battery with the lowest voltage will determine the voltages induced in the secondary coils. As all the coils are mounted on a common core, all the voltages induced in the secondary coils are equal, and the largest proportion of the secondary current will flow into the battery with the lowest voltage without the need for any additional selection logic, so that the charge of series of connected battery strings B1, B2, B3 and B4 can be maintained to a proper voltage without overcharging.

There are two difficulties in this type of battery charge equalizer constructed with a flyback converter. One of them is that the battery charge equalizer constructed with a flyback converter requires a plurality of sets of secondary coils charged equally in a series of connected battery strings with a plurality of batteries, which mounts all the coils on a common core to render all the voltages induced in the secondary coils equal. Thus the structure of transformer is complicated and is difficult to manufacture. The other difficulty is that the battery charge equalizer constructed with a flyback converter, the transformer of the flyback converter is not easy to symmetrize as each mounted coil on a common core has a plurality of sets in the secondary coil, so the effect of charge equalization is reduced. Furthermore, the type of battery charge equalizer constructed with a flyback converter in the various numbers of the batteries of the series of the connected battery strings is not conveniently adjustable.

SUMMARY OF THE INVENTION

It is therefore an objective of the present invention to provide a battery charge equalizer with multiple of flyback converters for each battery of the series of connected battery strings.

It is another objective of the present invention to provide a battery charge equalizer employing various numbers of the batteries of the series of connected battery strings that is conveniently adjustable.

It is still another objective of the present invention to provide a battery charge equalizer using a microcontroller to produce a set of pulse-width-modulated (PWM) signals to control the operation of a plurality of sets of flyback converters simultaneously.

It is yet another objective of the present invention to provide a battery charge equalizer with flyback converters for controllably drawing out the currents of the batteries in the series of connected battery strings, as their voltages are higher than a pre-determined voltage, by programming the duty cycles of pulse-width-modulated signals, so as to control the recharging currents back to the whole series of connected battery strings.

In accordance with the present invention, the battery charge equalizer comprises:

a battery voltage sensing means for detecting each of the battery voltages in the series of connected battery strings and scaling the detected battery voltages to a proper voltage level to output;

a microcontroller for receiving the output voltage signals scaled to a proper voltage level from the battery voltage sensing means and digitizing the output voltage signals and comparing them with a pre-determined voltage value, if any one of the digitized voltage signals from the batteries of the series of connected battery strings are higher than the pre-determined voltage value, to output a corresponding digitized signal; and for producing a set of pulse-width-modulated (PWM) signals to output;

a logic and driving means for receiving the digitized signals and the pulse-width-modulated signals from the microcontroller and enhancing the driving capability of these signals after a logic process, then processing to output; and a flyback converter means for receiving the signals from the logic and driving means then to draw out the currents of the batteries in the series of connected battery strings as the digitized voltage signals are higher than the pre-determined voltage value, and then to charge the whole battery strings by recharging currents which proportion to said drawn out currents.

One aspect of the present invention is that it has a plurality of flyback converters where the flyback converter means to draw out the currents of the batteries in the series of connected battery strings. Another aspect of the present invention is that there are multiple battery voltage sensing circuits in the battery voltage sensing means and multiples of the flyback converters in the flyback converter means using the common microcontroller which produces a set of pulse-width-modulated (PWM) signals to control the operation of the multiple of flyback converters simultaneously. The third aspect of the present invention is that the microcontroller controls the flyback converters to draw out the currents of the batteries in the series of connected battery strings as their voltages are higher than a pre-determined voltage. It accomplishes such control by programming the duty cycles of pulse-width-modulated signals, so that it can controllably draw out the currents of the batteries and then to charge the whole battery strings by recharging currents which proportion to said drawn out currents.

The battery charge equalizer of the present invention can be used in electric power vehicles, such as an electric motorcycle, which utilizes multiple of batteries in a series of connected battery strings as a power source. The present invention improves the life of the battery strings.

BRIEF DESCRIPTION OF THE DRAWINGS

The invention can be more fully understood by reading the following detailed description of a preferred embodiment, with reference made to the accompanying drawings in which the same numerals present the corresponding component, wherein:

FIG. 8A–8D illustrates the detailed circuit diagram of the embodiment of the present invention, wherein FIG. 8A is the detailed circuit diagram of the battery voltage sensing circuits; FIG. 8B is the detailed circuit diagram of the microcontroller; FIG. 8C is the detailed circuit diagram of the logic and driving circuits and the flyback converters; and FIG. 8D is the circuit diagrams of a set of the series of connected battery strings and the connection between connectors JP3 and JP4.

DESCRIPTION OF THE PREFERRED EMBODIMENT

Figure 1:
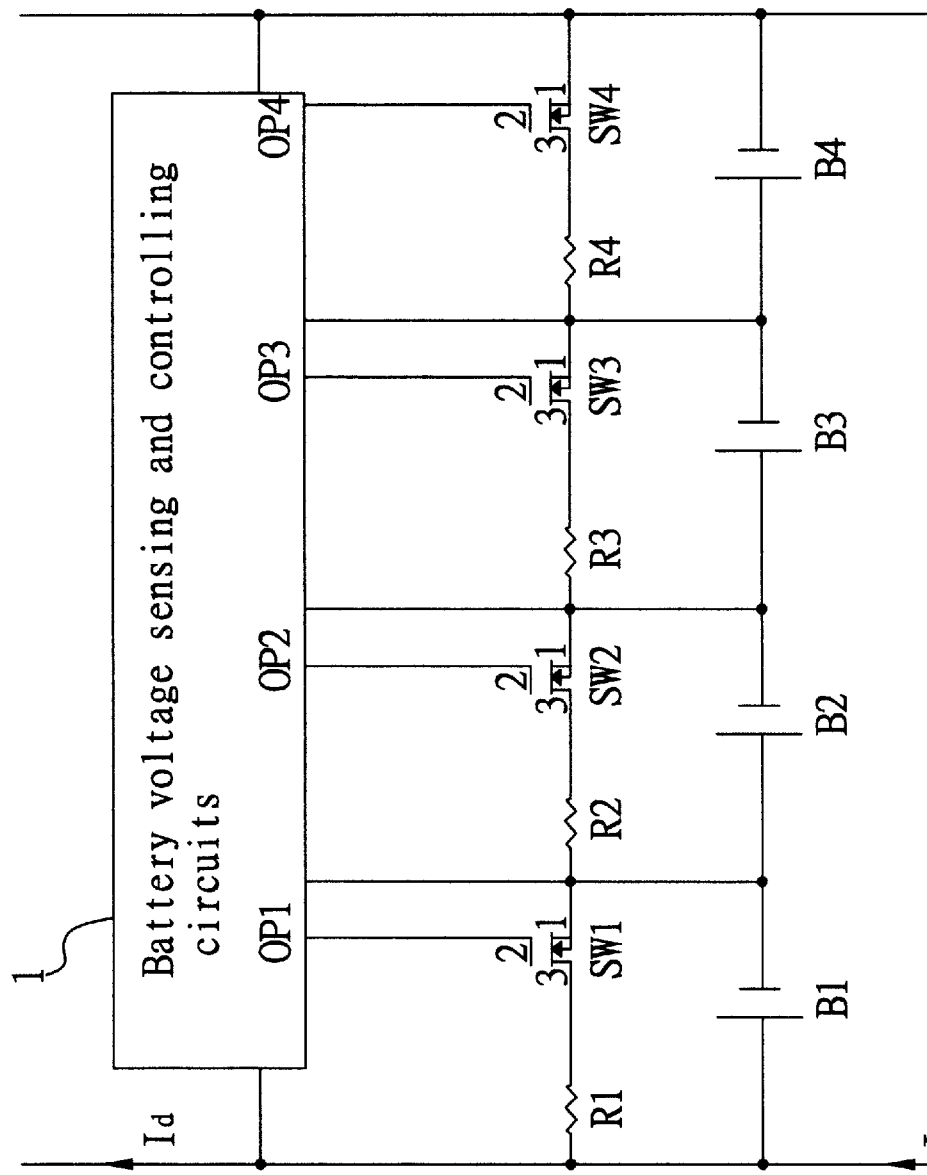
FIG. 1 is a schematic diagram of a conventional battery charge equalizer constituted with shunt resistors.
Figure 2:
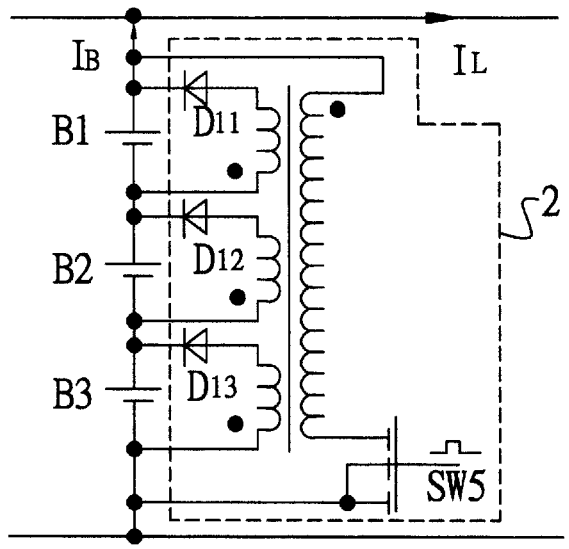
FIG. 2 is a schematic diagram of a conventional battery charge equalizer constituted with flyback converters.
Figure 3:
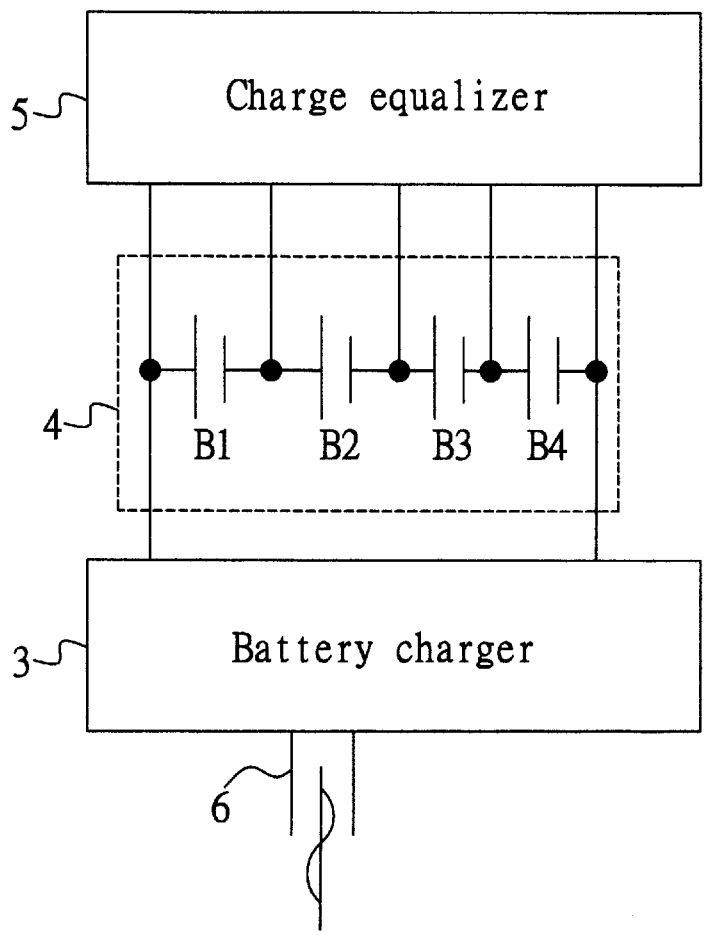
FIG. 3 is a configuration diagram of a charge equalizer adapted battery charger set to charge a set of the series of the connected battery strings of the present invention.

FIG. 3 shows a configuration diagram of a charge equalizer adapting a battery charger to charge a set of series of connected battery strings according to the present invention, wherein an alternative current (AC) source 6 charges the series of connected battery strings 4 comprising four series of connected batteries B1, B2, B3 and B4 via a battery charger 3. A charge equalizer 5 of the present invention is connected to the batteries B1, B2, B3 and B4 respectively to detect each of the battery voltages of the four series of connected batteries B1, B2, B3 and B4 and compares these four detected battery voltages to a pre-determined voltage. If any one of the battery voltages is higher than the pre-determined voltage, the corresponding flyback converter of the battery charge equalizer 5 is activated to draw out the current of the corresponding battery, and then to charge the whole battery strings by recharging currents which proportion to said drawn out currents, so as to prevent the batteries of the series of connected battery strings from overcharging and achieving the purpose of equal charge.

Figure 4:
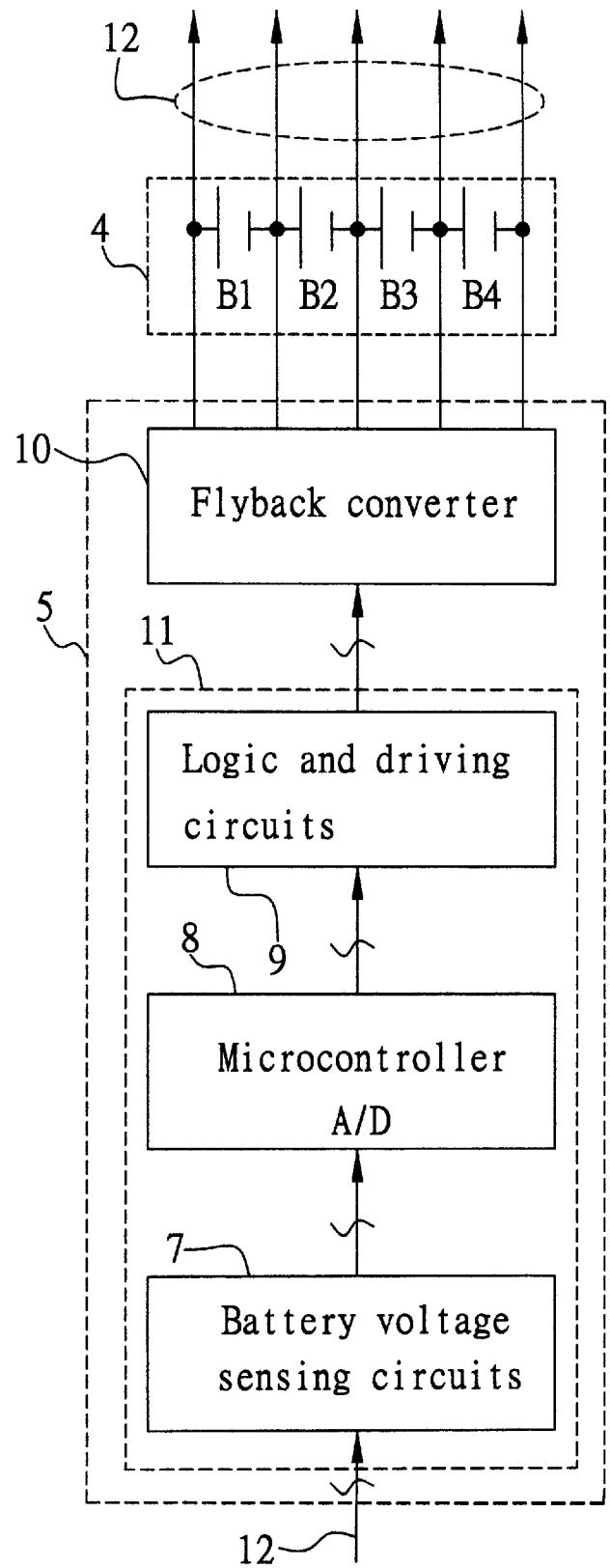
FIG. 4 is a circuit block diagram showing a charge equalizer of an embodiment of the present invention.

FIG. 4 is a circuit block diagram of the charge equalizer of an embodiment of the present invention. The battery charge equalizer 5 comprises battery voltage sensing circuits 7, a microcontroller 8, logic and driving circuits 9, and flyback converters 10, wherein the battery voltage sensing circuits 7, the microcontroller 8 and the logic and driving circuits 9 are called sensing and processing circuits 11. The microcontroller 8 of the present invention utilizes INTEL N87C196MC which is an embedded microcontroller, or we can use other kinds of controllers having similar functions. Battery voltage sensing circuits 7 receive the voltage signals of the batteries B1, B2, B3 and B4 of the battery strings 4 via wires 12. After scaling and protecting these voltage signals to proper voltage levels, we can obtain four independent 0–5 V level voltages entering an analog/digital converter of the microcontroller 8 for digitizing and comparing to a pre-determined voltage value. If any one of the digitized voltage signals from the batteries of the series of connected battery strings is higher than the pre-determined voltage value, it will output a corresponding digital signal to the logic and driving circuits 9. In the meantime, the microcontroller 8 will produce a set of pulse-width-modulated (PWM) signals in constant frequency and constant duty to output to the logic and driving circuits 9. As any one of the battery voltages B1, B2, B3 and B4 of the series of connected battery strings 4 is higher than the pre-determined voltage value, 14.7 V, the microcontroller 8 will output a corresponding enabling signal to render the logic and driving circuits 9 able to react, actuating the flyback converters 10 to correctly draw out the currents of the batteries in the series of connected battery strings 4 and then to charge the whole battery strings 4 by recharging currents which proportion to said drawn out currents, so as to achieve the purpose of achieving equal charge in each battery without overcharge. The microcontroller 8 controls the flyback converters 10 to draw out the currents of the batteries in the series of connected battery strings 4 as their voltages are higher than a pre-determined voltage. By programmably changing the duty cycles of pulse-width-modulated signals, the amount of the drawn out currents from the batteries and the recharging return currents to the whole series of connected battery strings are controllable.

Figure 5:
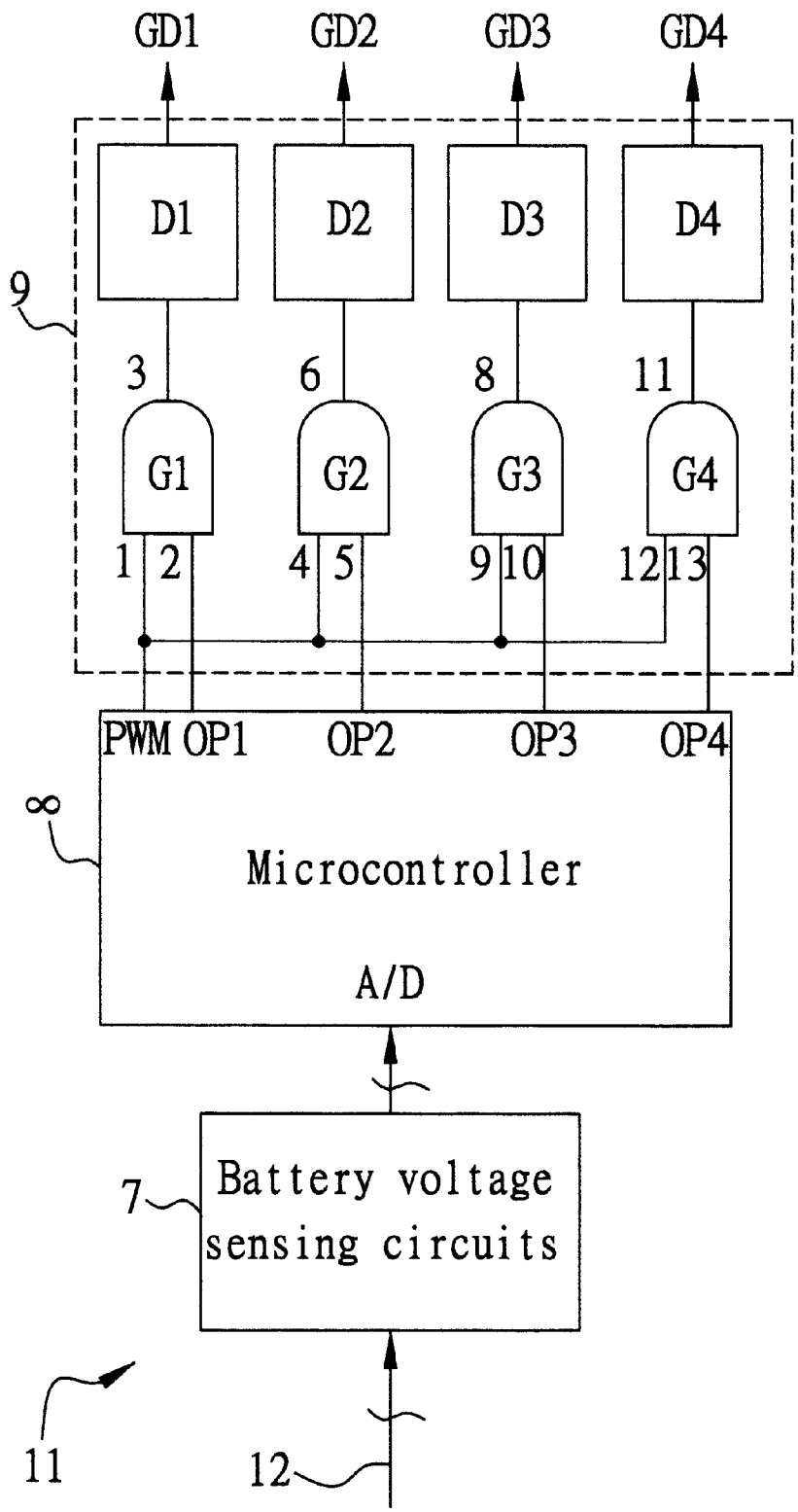
FIG. 5 is a circuit block diagram of a sensing and processing circuits of the embodiment shown in FIG. 4 of the present invention.

The sensing and processing circuits 11 shown in FIG. 4 comprises the battery voltage sensing circuits 7, the microcontroller 8 and the logic and driving circuits 9, wherein the circuit block diagram of the logic and driving circuits 9 is shown in FIG. 5. The logic and driving circuits 9 include 4 sets of "AND" gates G1–G4, each of the "AND" gates of G1–G4 connecting to a corresponding driver of D1–D4. As any one of the battery voltages of B1, B2, B3 and B4 of the series of connected battery strings 4 detected by the battery voltage sensing circuits 7 via a set of wires 12 is higher than the pre-determined voltage value (e.g. 14.7 V), the microcontroller 8 will output a set of pulse-width-modulated (PWM) signals in constant frequency and constant duty to the "AND" gates G1–G4 of the logic and driving circuits 9. If the voltage of the B1 battery is higher than 14.7 V, for example, the OP1 signal of the microcontroller 8 will change from a low state to a high state, 0→1, to render the "AND" gate G1 to output a set of PWM signals which enhance the driving capability by passing through the driving circuit D1 as a buffer, to output a GD1 signal to make the flyback converters 10 act correctly and draw out the current of the battery B1 whose voltage is too high and then to charge the whole battery strings 4 by recharging currents which proportion to said drawn out currents.

Figure 6:
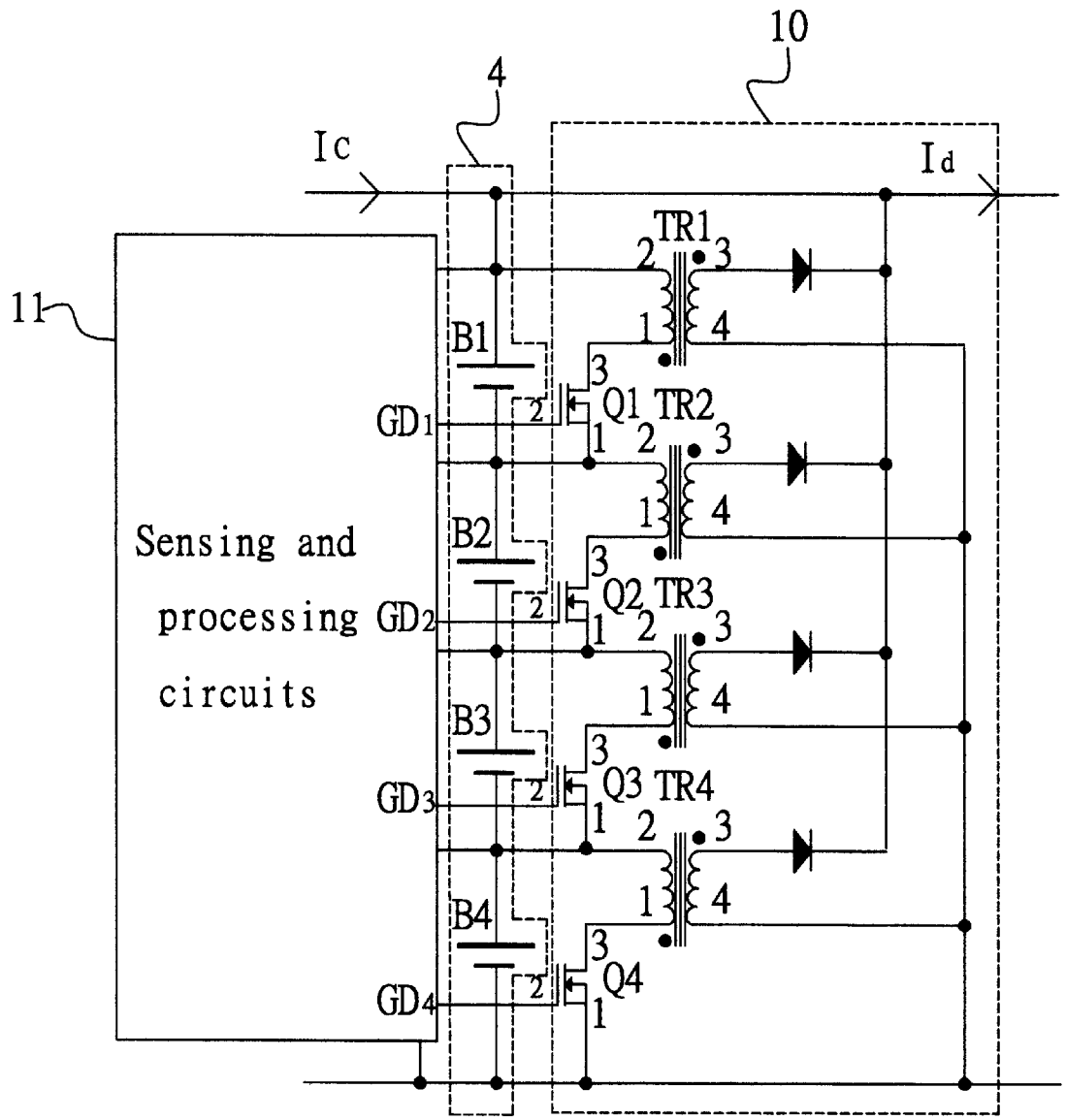
FIG. 6 is a schematic diagram of the sensing and processing circuits and the flyback converters adapting the series of connected battery strings shown in FIG. 4 of the embodiment of the present invention.
Figure 7A:
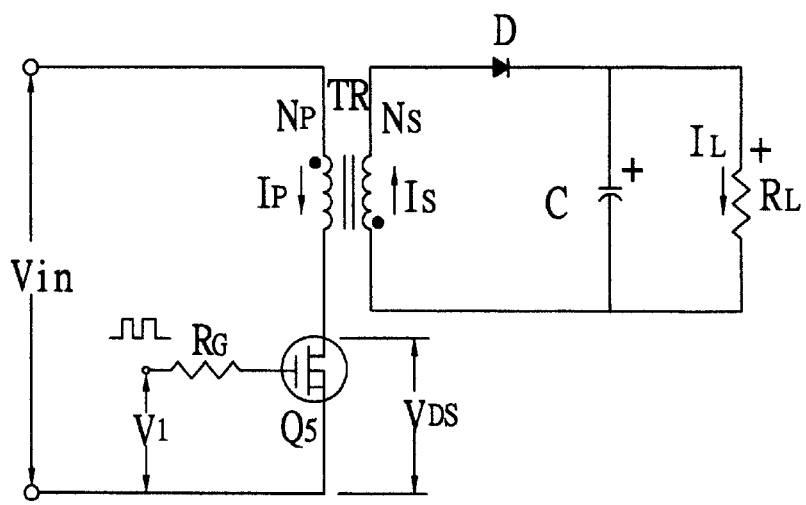
FIG. 7A is a schematic diagram showing a general flyback converter.
Figure 7B:
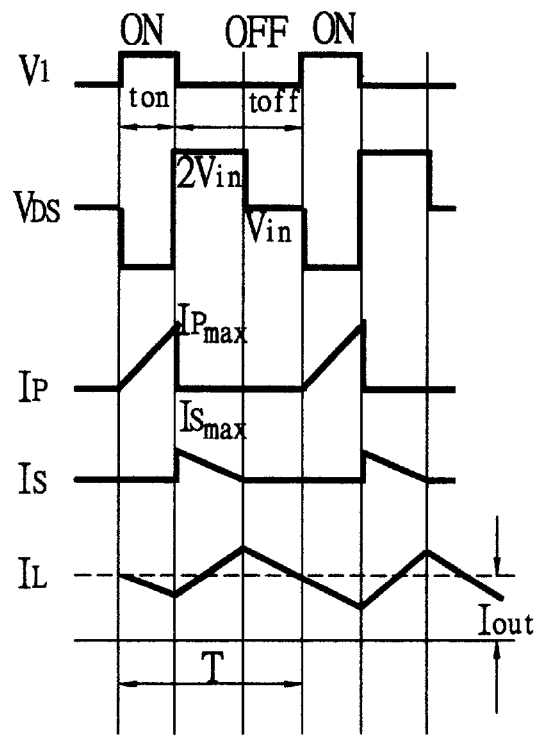
FIG. 7B illustrates the waveforms of signals of the flyback converter shown in FIG. 7A as on steady state.
Figure 8A:
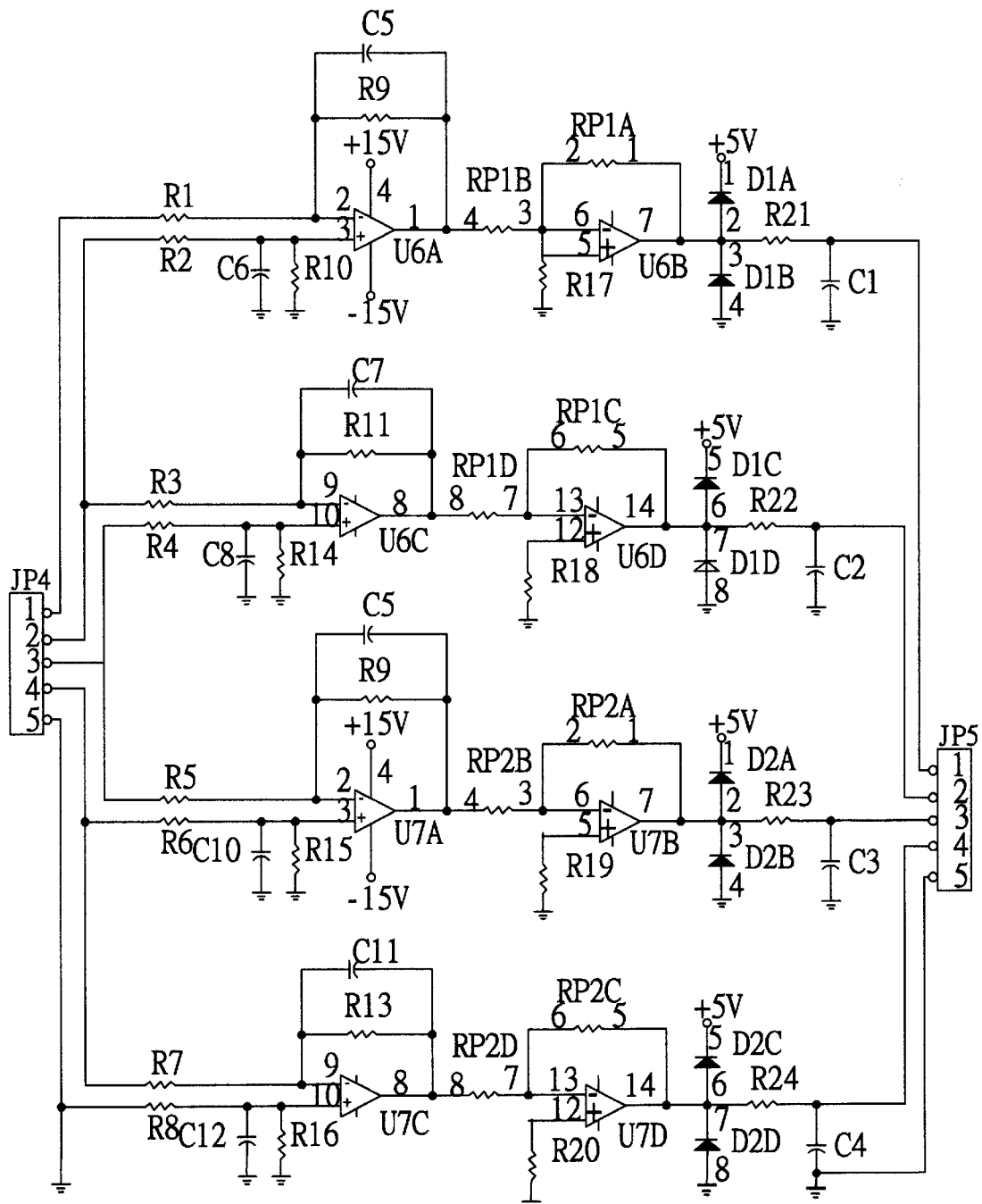
Figure 8B:
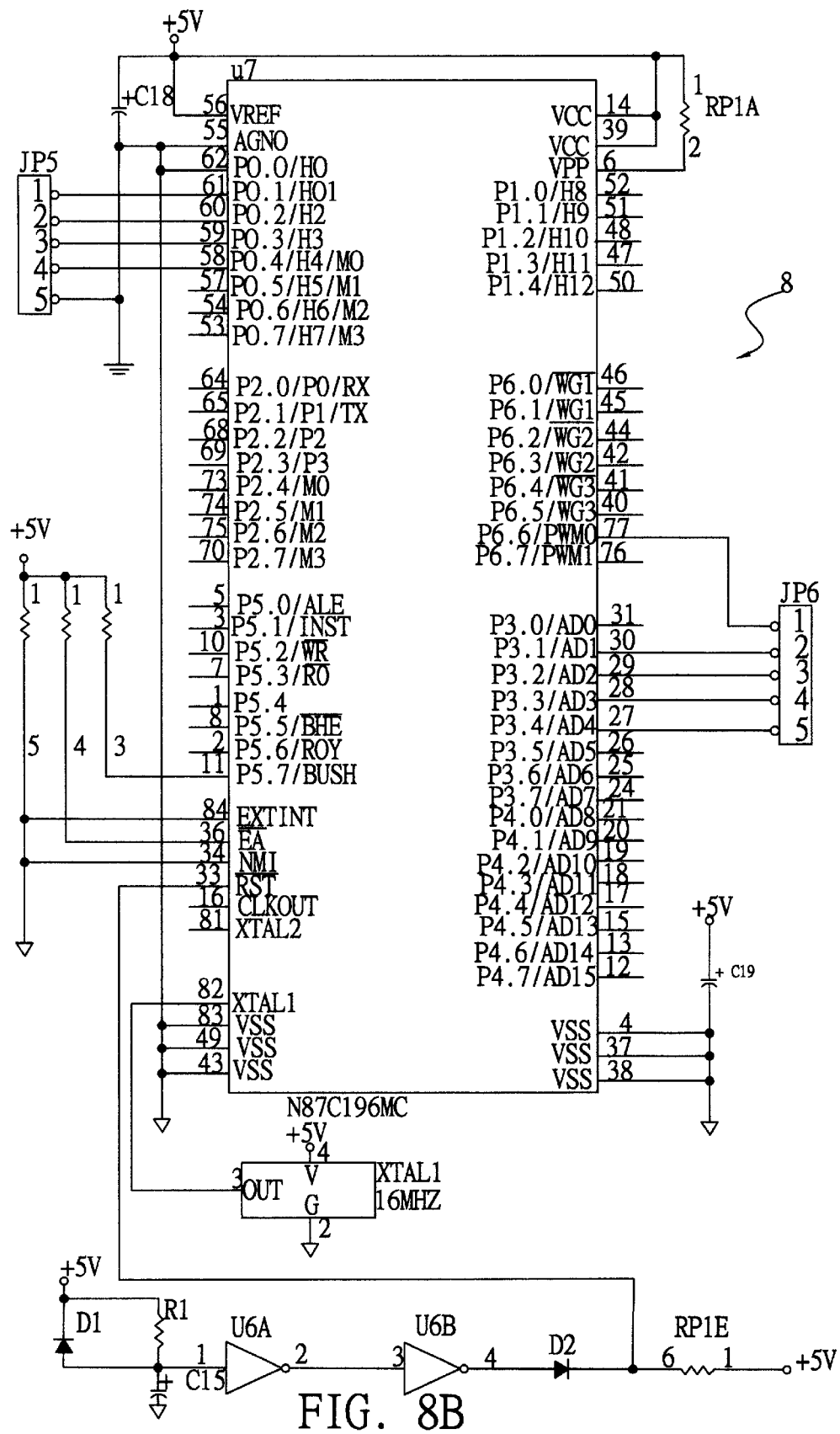

FIG. 6 is a schematic diagram comprising the sensing and processing circuits 11, the series of connected battery strings 4 and the flyback converters 10, especially to show the structure of the flyback converters 10 which is a multiple of flyback converters. As the voltage of the B1 battery is higher than 14.7 V, for example, the OP I signal of the microcontroller 8 will change from a low state to a high state, 0→1, to render the "AND" gate G1 to output a set of PWM signals, which are enhanced their driving capability by passing through the driving circuit D1 as a buffer, and produce a GD1 signal in constant frequency and constant duty to turn on a switch Q1 in the flyback converters 10. This draws out the current of the battery B1 whose voltage is too high and stores the electric energy in a primary winding of the transformer TR1, and transfers this energy stored in the primary winding to a secondary windings of the transformer TR1, then charges the whole battery strings 4 by recharging the secondary currents which proportion to said drawn out currents, as the switch Q1 is being turned off FIG. 7A is a schematic diagram showing a general flyback converter and FIG. 7B shows the waveforms of the signals on the flyback converter shown in FIG. 7A as on steady state. The function of a transformer TR of the isolated flyback converter shown in FIG. 7A is operated as a choke. The electric energy will be stored in the primary windings of the transformer TR by a current passing through the primary winding as a transistor Q5 is turned on. Because the polarities of input winding and the output winding of the transformer-choke are opposite, a diode D is reversely biased, so that there is no energy transferred to a load $R_L$. As the transistor Q5 is turned off, the polarities of the input winding and the output winding of the transformer-choke are inverted; the diode D is conducted; at the same time a capacity C on the output will be charged; there is current $I_L$ passing through the load $R_L$. The current waveforms of the primary current is $I_P$, secondary current is $I_s$ and load current is $I_L$ in the steady state are shown in FIG. 7B, where:

$I_P = (V_{in}/L_P) \times t$ $I_{PMAX} = (V_{in}/L_P) \times t_{ON}$ $I_{SMAX} = (N_P/N_s) \times I_{PMAX}$ $V_{in}$: the input voltage of the flyback converter $L_P$: the primary winding inductance of the transformer $N_P$: the number of coils of the primary winding of the transformer $N_S$: the number of coils of the secondary winding of the transformer $P_{MAX}$: the maximum current of the primary winding of the transformer $I_{SMAX}$: the maximum current of the secondary winding of the transformer FIG. 8A–8D illustrate the detail circuit diagram of the embodiment of the present invention, wherein FIG. 8A is the detail circuit diagram of the battery voltage sensing circuits 7 in which differential amplifiers U6A, U6C, U7A and U7C detect, from a connector JP4, the corresponding voltage signals of the batteries B1, B2, B3 and B4 in the series of connected battery strings 4 and scale these voltage signals to a proper voltage level; U6B, U6D, U7B, U7D are inverters to output 0–5 V voltage respectively to a connector JP5. FIG. 8B is the detail circuit diagram of the microcontroller, in which we can realize that the multiple of battery voltage sensing circuits and the control of multiple of flyback converters used in the present invention use the common microcontroller. The four 0–5 V voltage signals from the battery voltage sensing circuits 7 are sent to the analog/digital converter of the microcontroller 8 via the connector JP5 through pins of 58, 59, 60, 61 respectively, to digitize these analog signals and output digital OP1–OP4 signals through pins of 27, 28, 29, 30 respectively as well as output a set of pulse-width-modulated (PWM) signals in constant frequency and constant duty through pin 77. As any one of the battery voltages B1, B2, B3 and B4 of the series of connected battery strings 4 is higher than the pre-determined voltage value, such as 14.7 V, the microcontroller 8 outputs one corresponding digital signal of OP1–OP4 in a high state.

Figure 8C:
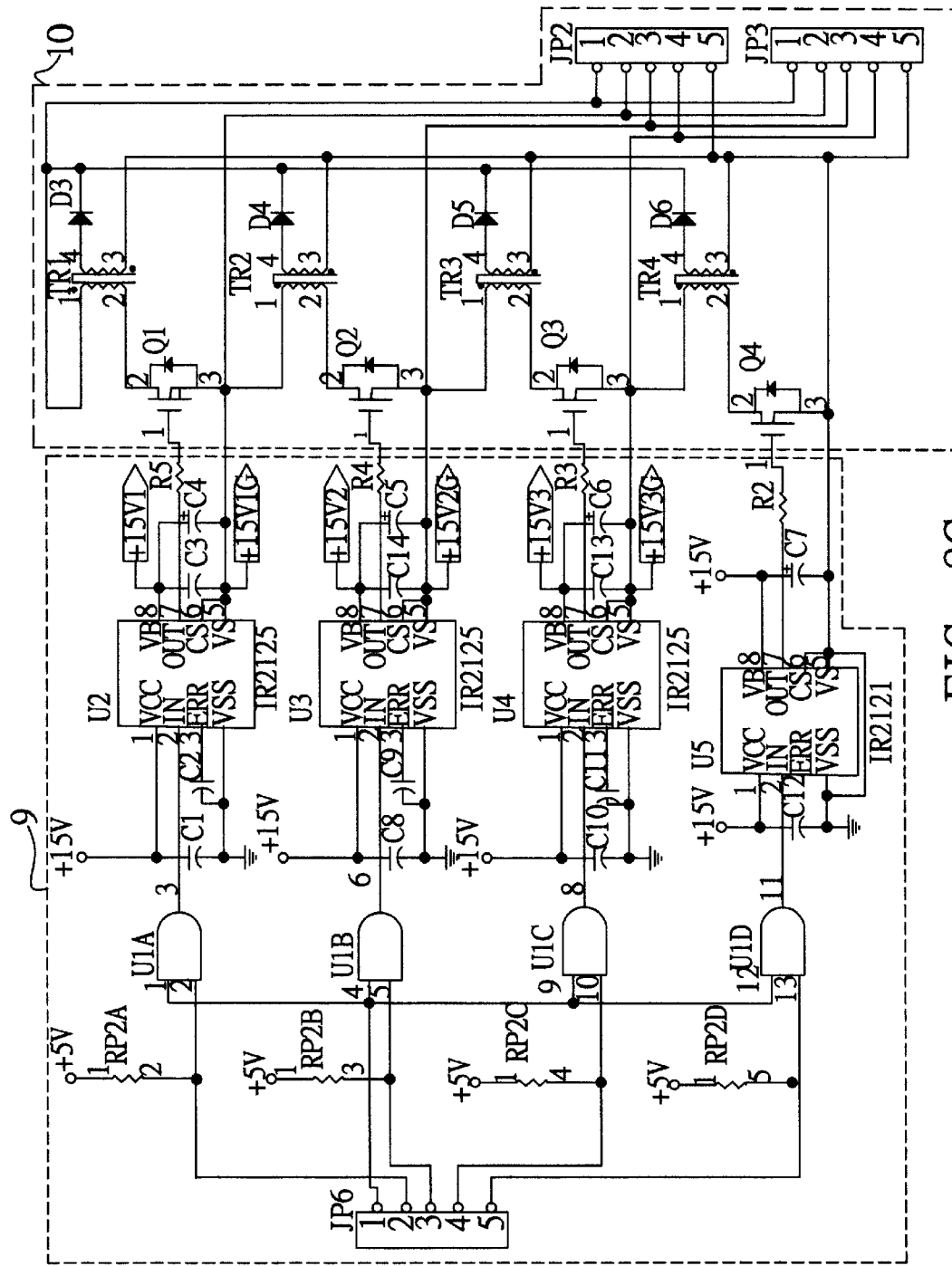
Figure 8D:
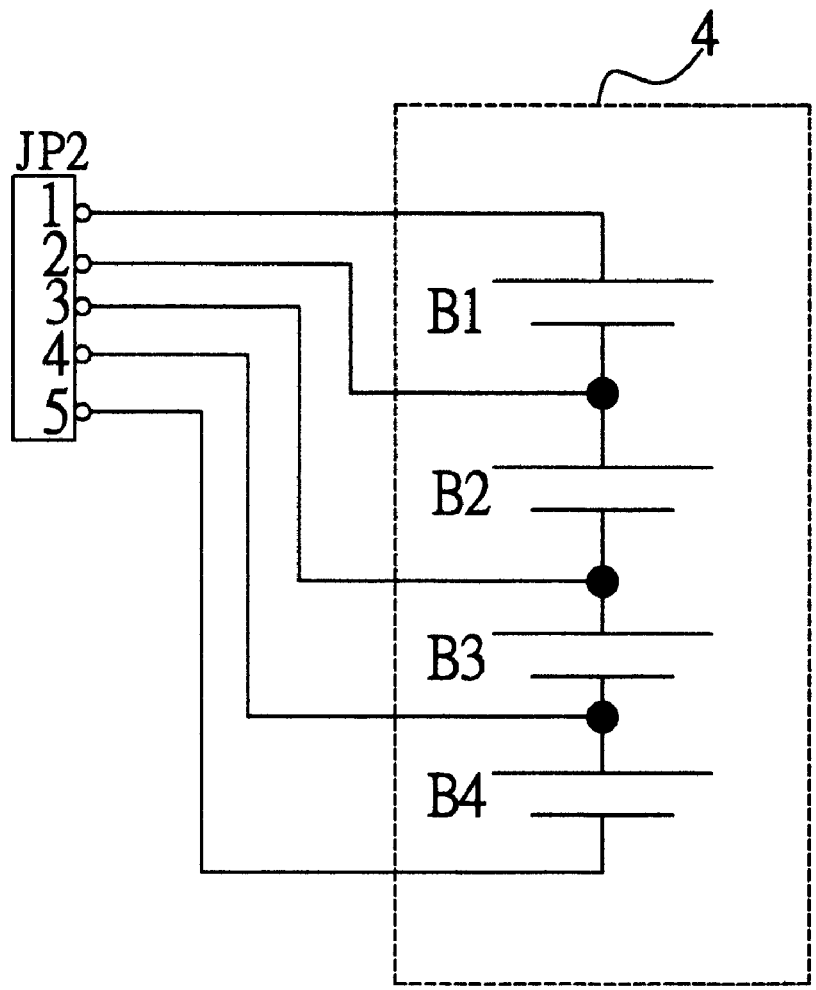
Figure 8D:
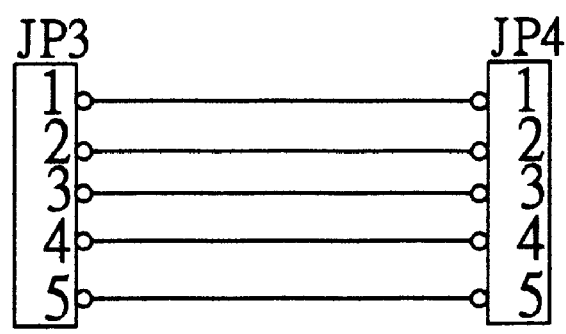

FIG. 8C is the detail circuit diagram of the logic and driving circuits 9 and the flyback converters 10, wherein U1A, U1B, U1C and U1D are "AND" gates G1–G4 respectively receiving the corresponding digital signals OP1–OP4 from the microcontroller 8; U2, U3, U4, U5 are drivers D1–D4, respectively, used as buffers for enhancing the driving capability of the output signals of G1–G4. In the flyback converters 10, as illustrated in FIG. 6, if any one of the switches Q1–Q4 is turned on by the corresponding output signal from D1–D4, it will draw out the corresponding battery current whose voltage is too high and store electric energy in the primary winding of the transformer, and as the switch is turned off, it will transfer the energy stored in the primary winding to the secondary windings of the transformer to charge the whole battery strings 4 by recharging currents which proportion to said drawn out currents. FIG. 8D is the circuit diagrams of a set of the series of connected battery strings and the connection between connectors JP3 and JP4, wherein a connector JP2 connects to the flyback converters 10 and the connector JP3 of the flyback converters 10 connects to the connector JP4 of the battery voltage sensing circuits 7.

The present invention can be tactfully used to equally charge a series of connected battery strings with a different number of the batteries by utilizing flyback converters, also to equally charge more than two sets of the series of connected battery strings simultaneously. The battery charge equalizer of the present invention uses multiples of flyback converters; the multiples of battery voltage sensing circuits and multiples of flyback converters use a common microcontroller that does not have a decentralized control style. A set of pulse-width-modulated (PWM) signals produced by the microcontroller can control the operation of the multiples of flyback converters simultaneously, and their duty cycle of the PWM signals can be changed by programming these signals so as to control the drawing out currents of the batteries in the series of connected battery strings. As their voltages are higher than a pre-determined voltage, as well as they control the whole charging back currents of the series of connected battery strings. Moreover, the transformer of the flyback converters can be designed for applying them in various series of connected battery strings with different battery capacity.

Although the present invention has been described and illustrated in detail, it is clearly understood that what disclosed is by way of illustration and example only and is not to be taken as a limitation; the spirit and scope of the present invention is limited only by the appended claims.

What is claimed is:

1. A charge equalizer adapting a battery charger to an equally charged series of connected battery strings, comprising:

a battery voltage sensing means for detecting each of the battery voltage in the series of connected battery strings and scaling the detected battery voltages to a proper voltage level to output;

a microcontroller for receiving the output voltage signals scaled to a proper voltage level from the battery voltage sensing means and digitizing the output voltage signals and comparing them with a pre-determined voltage value, if any one of the digitized voltage signals from the batteries of the series of connected battery is higher than the pre-determined voltage value, to output a corresponding digital signal; and for producing a set of pulse-width-modulated (PWM) signals to output;

a logic and driving means for receiving the digital signals and the pulse-width-modulated signals from the microcontroller and enhancing the driving capability of these signals after a logic process, then to output; and a flyback converter means for receiving the signals from the logic and driving means then to draw out the currents of the batteries in the series of connected battery strings as the digitized voltage signals are higher than the pre-determined voltage value, and then to charge the whole battery strings by recharging currents which proportion to said drawn out currents.

2. A charge equalizer of claim 1, wherein said flyback converter means comprises multiples of flyback converters.

3. A charge equalizer of claim 2, wherein said battery voltage sensing means comprises multiples of battery voltage sensing circuits.

4. A charge equalizer of claim 3, wherein said multiples of flyback converters and said multiples of battery voltage sensing circuits utilize said microcontroller in common.

5. A charge equalizer of claim 2, wherein said a set of pulse-width-modulated (PWM) signals produced by said microcontroller can control the operation of said multiples of flyback converters simultaneously.

6. A charge equalizer of claim 2, wherein said microcontroller controls said flyback converters to draw out the currents of corresponding said batteries in the series of connected battery strings as the voltages of said batteries being higher than the pre-determined voltage respectively by programmable changing the duty cycles of pulse-width-modulated signals, so that it controllably draws out the currents from the batteries as well as controlling to charge the whole battery strings by recharging currents which proportion to said drawn out currents.

* * * * *